United States Patent [19]

Hoelman

[11] 4,069,686
[45] Jan. 24, 1978

[54] COUPLING FOR USE IN SERVICING AIR CONDITIONING SYSTEMS

[76] Inventor: Walter A. Hoelman, 777 Quince Orchard Blvd., Gaithersburg, Md. 20760

[21] Appl. No.: 720,987

[22] Filed: Sept. 7, 1976

[51] Int. Cl.² ............... F25B 45/00; F25D 19/00; F16K 43/00; B65B 1/04
[52] U.S. Cl. ............... 62/292; 62/299; 137/322; 141/349; 251/348
[58] Field of Search ............... 62/299, 292; 251/341, 251/347, 348, 148, 149.8; 141/349; 137/614.05, 322

[56] References Cited

U.S. PATENT DOCUMENTS

| | | | |
|---|---|---|---|
| 1,601,961 | 10/1926 | Allen | 251/348 |
| 1,828,934 | 10/1931 | Kramer | 141/349 |
| 2,614,400 | 10/1952 | May | 62/292 |
| 2,874,996 | 2/1959 | Zajac | 137/322 |
| 3,645,496 | 2/1972 | Rawlins | 251/148 |
| 3,976,110 | 8/1976 | White | 141/349 |

Primary Examiner—Lloyd L. King

Attorney, Agent, or Firm—Shlesinger, Arkwright, Garvey & Dinsmore

[57] ABSTRACT

A coupling for attachment to air conditioning systems to prevent leakage of refrigerant fluid during testing and servicing thereof. The coupling includes an elongated outer housing adapted to be attached at one end to an air conditioning system. The housing is provided with an axial bore in which is positioned an inner cylindrical body member having longitudinal ducts, which member is movable longitudinally with respect to the outer housing. One end of the inner body member is adapted to be selectively engaged with testing equipment or a refrigerant fluid supply. A portion of the inner housing is aligned with a valve of the air conditioning system which is actuated thereby upon longitudinal movement of the inner body member, thereby permitting refrigerant fluid to flow through the ducts in the inner body member from the refrigerant supply to the air conditioning system. Means carried by the inner body member facilitate longitudinal movement thereof.

10 Claims, 5 Drawing Figures

COUPLING FOR USE IN SERVICING AIR CONDITIONING SYSTEMS

BACKGROUND OF THE INVENTION

In the testing and servicing of air conditioning systems, it has been conventional practice to thread the equipment onto a nipple of the air conditioning system housing a Schrader valve or a similar type valve which is actuated by depression of a needle. During the attachment of this equipment to the valve, the needle is depressed and some of the refrigerant fluid escapes from the air conditioning system and is lost in the atmosphere. Additionally, the escaping refrigerant fluid comes in contact with the hands of the person attaching the equipment to the system causing a burning of the skin on the fingers. Consequently, when this operation must be repeated frequently, hands become sore with the possibility of permanent injury.

This problem is recognized in U.S. Pat. No. 3,645,496 granted Feb. 29, 1972 to Clarence G. Rawlins who developed a device for servicing refrigerator systems to prevent refrigerant fluid from escaping while testing or servicing such equipment. The Rawlins device is a T-shaped coupling, the central leg of which is connected to testing equipment or refrigeration fluid supply means. One end of the cross member of the T-shaped coupling is engaged with a valved access nipple, and the other end of the cross shaped member has a movable shaft extending therethrough for actuating the valve at the opposite end thereof.

SUMMARY OF THE INVENTION

The present invention is a coupling for servicing air conditioning systems to prevent leakage of refrigerant fluid during servicing, which coupling is of simple, economical construction requiring a minimum of parts which may be quickly connected to, and disconnected from, the equipment and air conditioning system.

The coupling of the present invention includes an outer tubular housing of rectilinear shape which is adapted to receive an inner body member which is longitudinally movable within the outer housing to actuate the valve of the air conditioning system. Duct means extend longitudinally through the inner member so that, when the valve of the air conditioning system is actuated, the refrigerant fluid may flow freely through the outer housing and the inner member from the refrigerant supply to the air conditioning system.

An arm extending diametrically through the inner member and through a bayonet slot in the outer housing enables a limited movement of the inner member with respect to the outer member, and also affords means for locking the coupling in operative position when attached to the air conditioning system.

The present coupling affords an in-line member interposed between an air conditioning system and the testing equipment or refrigerant supply which may be readily positioned for use, which coupling may be removed after use, or may be permanently attached to either the air conditioning unit, testing equipment or refrigerant fluid supply means.

DESCRIPTION OF THE INVENTION

Figure 1:
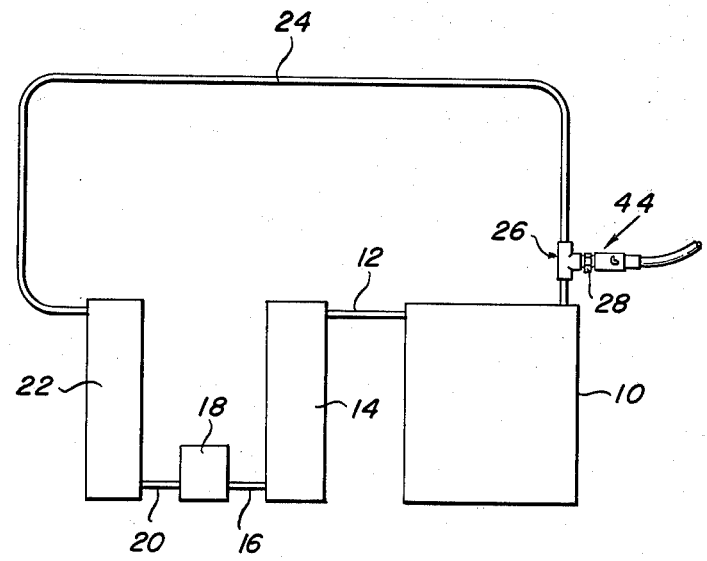
FIG. 1 is a schematic view of an air conditioning system illustrating the use of the present invention.

In FIG. 1 there is illustrated a refrigeration system including a compressor 10 connected by a conduit 12 to an evaporator 14. A conduit 16 extends from evaporator 14 to an expansion valve 18 which is in turn connected by a conduit 20 to a condenser 22. A conduit 24 extends from condenser 22 to compressor 10 to provide a closed system. A T-connection 26 is positioned in conduit 24.

T-connection 26 includes a nipple 28, one end of which is threaded into T-connection 26 at 30. Nipple 28 includes an axial bore 32 in which is located a Schrader valve generally designated 34 having a needle member 36 on which is mounted a valve 38 adapted for engagement with a valve seat 40. Valve 34 is normally biased to a closed position by a convolute spring 44. The outer periphery of the nipple terminal is threaded at 43.

The attachment of the present invention is generally designated 44 and includes an outer housing 46 of elongated tubular construction having an axial bore 48 extending completely therethrough, the bore at one end being internally threaded at 50 for threaded engagement with the outer end of nipple 30. Axial bore 48 is reduced in cross sectional area through an intermediate portion of the housing as indicated at 52. An annular gasket 54 is positioned in reduced bore 52.

Figure 3:
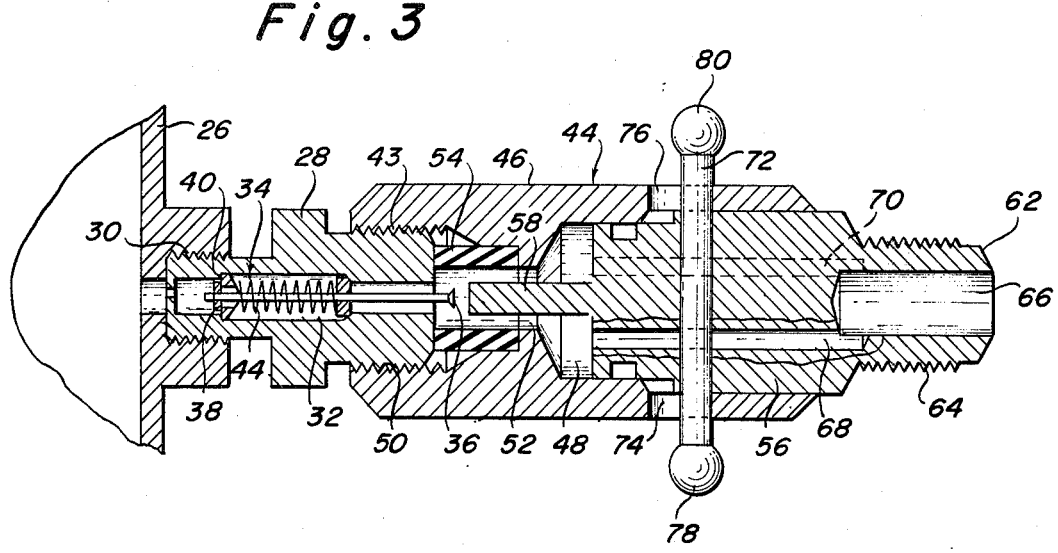
FIG. 3 is a longitudinal sectional view of the device of the present invention shown attached to the air conditioning system, and showing the coupling in inoperative position.
Figure 4:
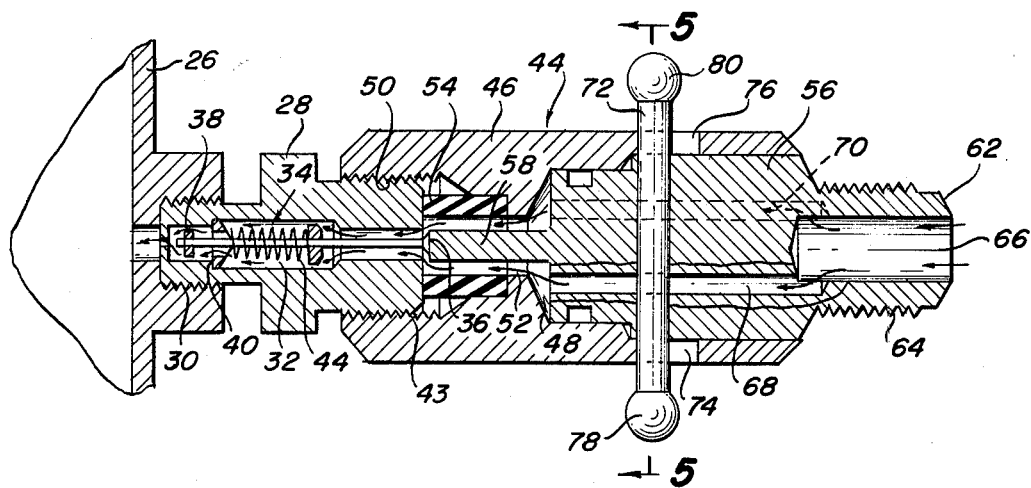
FIG. 4 is a view similar to FIG. 3, showing the coupling in operative position.
Figure 5:
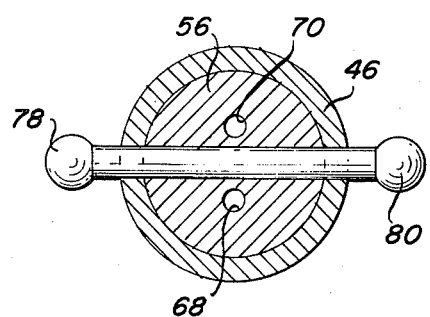
FIG. 5 is a sectional view taken along the lines 5—5 of FIG. 4, looking in the direction of the arrows.

The present attachment further includes an inner body member 56 of generally cylindrical construction the outer periphery of which is in frictional engagement with the inner periphery of the outer housing. One end is provided with a central extension 58 of reduced cross sectional area which is aligned with needle 36 of valve 34, as shown in FIGS. 3 and 4. Extension 56 extends through reduced bore 52, in spaced relation to the walls of the bore and gasket 54. A washer 60 is disposed in an annular recess in the outer periphery of body 56 in order to prevent leakage between inner body 56 and outer housing 46.

The opposite end of body member 56 is provided with a central extension 62, the outer periphery of which is threaded at 64. A bore 66 passes through the central extension 62. A pair of spaced ducts 68 and 70 extend longitudinally through inner body member 56, one end of ducts 68 and 70 being in communication with bore 66 and the other end thereof communicating with axial bore 50 of inner housing 48.

In order to effect sliding movement of inner body member 56 in outer housing 46, there is provided an arm 72 which extends diametrically through inner body member 56 and through bayonet slots 74 and 76 on diametrically opposed sides of outer housing 46. The terminals of arm 72 are enlarged at 78 and 80 which enlarged portions are adapted to be engaged by the thumb and index finger for moving inner member 56 longitudinally relative to outer housing 46.

OPERATION

In use of the device of the present invention, threads 64 of extension 62 are threaded into a complemental member 82 of a hose 84 attached to testing equipment or a refrigerant fluid supply source. The opposite end of the attachment housing is threaded onto the threaded portion 43 of nipple 28. During this procedure, the inner member 56 is in the retracted position shown in FIG. 3 with central extension 58 in spaced relation to needle member 36 of Schrader valve 34.

Figure 2:
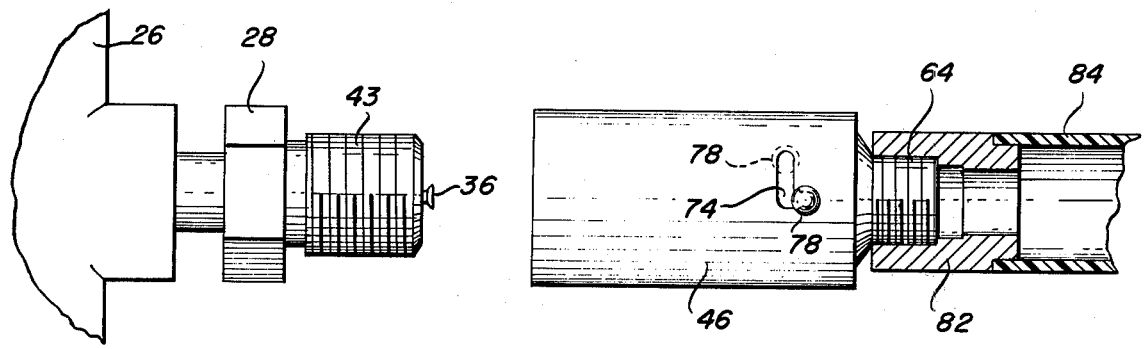
FIG. 2 is an enlarged side elevational view of the coupling of the present invention illustrating its use.

When it is desired to actuate the Schrader valve to test the fluid within the air airconditioning system, or to add additional refrigerant fluid, enlarged members 78 and 80 of arm 72 are engaged by the thumb and index finger, following which the inner member is slid longitudinally through the longitudinally extending portion of the bayonet slot, thereby depressing needle member 36, lifting valve 38 from valve slot 40 and establishing communication between the testing equipment or refrigerant fluid supply source and the air conditioning system. As shown by the arrows in FIG. 4, the refrigerant fluid passes through bore 66, ducts 68 and 70, bore 48, reduced bore 52, and through bore 32 of Schrader valve 36 to T connection 26. In order to positively preclude accidental closing of the Schrader valve during use of the coupling, arm 72 is rotated in a direction to effect movement of the terminals of the pin laterally in bayonet slots 74 and 76 so that enlarged portion 78 and 80 assume the position shown in dotted lines in FIG. 2. This locks the coupling in the operative position.

In removing the coupling from the air conditioning system, arm 72 is rotated until it is located longitudinally extending portion of the bayonet slot, on which the arm is moved in the direction to retract central extension 58 of the inner member away from needle member 36, thereby permitting the member to move longitudinally under the urging of convolute spring 42 to effect seating of valve 38 on 40.

Due to the fact that Schrader valve is not depressed or activated during attachment or removal of the coupling, there can be no leakage from the air conditioning system. It is only after the coupling is fully positioned in place that needle member 36 of the Schrader valve is depressed to permit flow of refrigerant fluid through the coupling. In this connection, also, it is noted that gasket 54 and washer 76 serve to prevent any leakage between the respective parts of the assembly. Not only does this result in a saving of the refrigerant fluid itself, but also prevents any harm to the hands of the workmen servicing air conditioning system which has heretofore resulted from escape of the refrigerant fluid.

It is further noted that the coupling of the present invention comprises a minimum of parts, wherein the refrigerant fluid passes in substantially a direct line through the coupling without any sharp turns which would impede the passage of the refrigerant fluid therethrough.

While there has been herein shown and described the presently preferred form of this invention, it is to be understood that such has been done for purposes of illustration only, and that various changes may be made therein within the scope of the pending claims.

What I claim is:

1. A coupling for use in connecting service equipment to an air conditioning system equipped with a valve positioned in a nipple leading to the refrigerant line, and having a movable needle member which is depressed to open the valve, the coupling including
   a. an outer tubular housing having a longitudinal bore extending therethrough,
   b. means on one end of said tubular housing for connecting the housing to the nipple of the air conditioning system,
   c. an inner cylindrical body member positioned within said outer tubular housing with the outer periphery of said inner cylindrical body member proximate the inner periphery of said outer tubular housing,
   d. one end of said inner cylindrical body member having a central extension for engaging and actuating the needle member of the air conditioning system valve,
   e. the opposite end of said inner cylindrical body member being provided with a tubular extension having an axial bore,
   f. means on said tubular extension for connecting the latter to the service equipment,
   g. ducts extending longitudinally through said inner cylindrical body member and in communication with the axial bore of said tubular extension, and
   h. an arm extending diametrically through said inner cylindrical body member,
   i. said outer tubular housing being provided with opposed slots adapted to receive the ends of said arm, whereby said inner cylindrical body member may be slid longitudinally of said outer tubular housing to actuate the needle member and open the valve.

2. The coupling of claim 1, with the addition of
   a. means for locking said arm in the operative position for maintaining the valve in an open position.

3. the coupling of claim 1, wherein
   a. said outer tubular housing is provided with opposed bayonet slots for receiving the ends of said arm,
   b. each of the bayonet slots including a portion extending longitudinally of the tubular housing to permit the arm to be moved in a direction to actuate the valve needle member, and a slot portion extending transversely of the tubular housing into which the arm passes for locking the arm in position to actuate the needle member.

4. The coupling of claim 1, with the addition of
   a. sealing means interposed between said outer tubular housing and said inner body member for preventing leakage of refrigerant fluid therebetween.

5. The coupling of claim 4, with the addition of
   a. gasket means positioned in the axial bore of said outer tubular housing proximate the central extension of said inner cylindrical body,
   b. said gasket means being adapted to engage the nipple housing the valve to prevent leakage of refrigerant fluid between the nipple and said outer tubular housing.

6. A coupling for use in connecting service equipment to an air conditioning system equipped with a valve positioned in a nipple leading to the refrigerant line, and having a movable needle member which is depressed to open the valve, the coupling including:
   a. an outer tubular member of elongated, rectilinear shape and having a longitudinal bore extending therethrough, b. means on one end of said outer member for connecting the same to the nipple of the air conditioning system,
c. an inner member positioned within the longitudinal bore of said tubular member and longitudinally movable with respect to said outer member,
d. means on one end of said inner member for connecting the same to the service equipment,
e. a portion of said inner member being extended and aligned with the depressible needle member of the valve whereby, upon relative longitudinal movement of said inner member in said outer member, the needle member is depressed to open the valve,
f. duct means extending longitudinally through said inner member and communicating with the longitudinal bore of said outer member, whereby the refrigerant fluid passes in a substantially straight line through the coupling, and
g. actuating means for slidably moving said inner member longitudinally of said outer member to the valve needle member and establish communication between the air conditioning system and service equipment.

7. The coupling of claim 6, with the addition of:
a. means for locking said inner member in position to actuate the needle member.
8. The coupling of claim 6, wherein:
a. said actuating means comprises an arm engaged with said inner member for manually effecting longitudinal movement of the latter with respect to said outer member.
9. The coupling of claim 8, wherein:
a. said outer member is provided with longitudinal slots in opposed sides thereof,
b. said arm extending transversely through said inner member and through the slots of said outer member.
10. The coupling of claim 9, wherein:
a. said slots are of the bayonet type including a portion thereof extending longitudinally of the outer member to permit the arm to be moved in a direction to actuate the valve needle member, and a slot portion extending transversely of the outer member for locking the arm in position to actuate the needle member.

* * * * *